Oct. 4, 1932.  G. T. TOKUNAGA  1,880,580
RAKE
Filed July 8, 1931
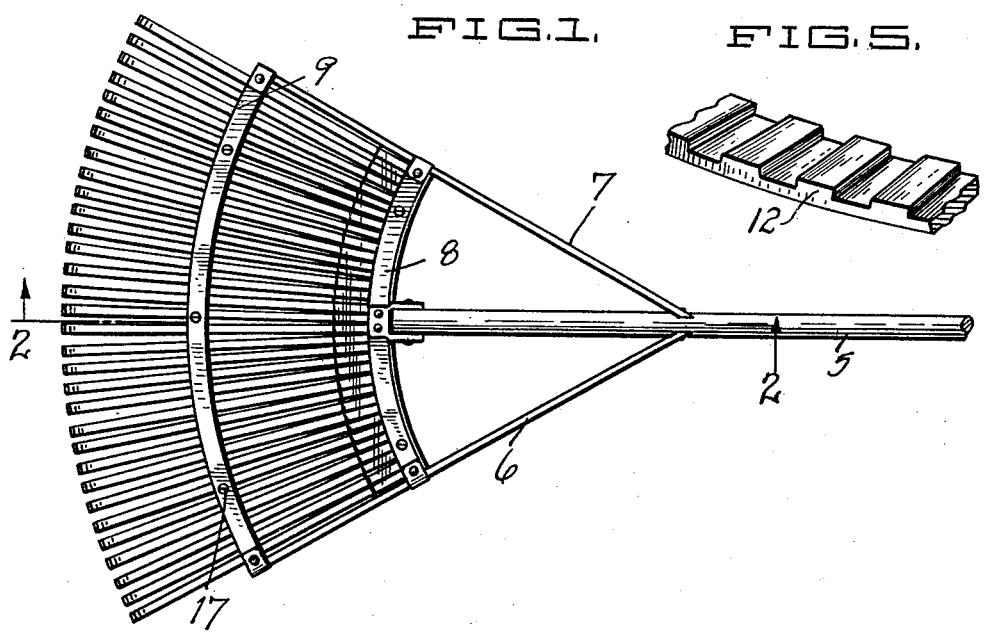
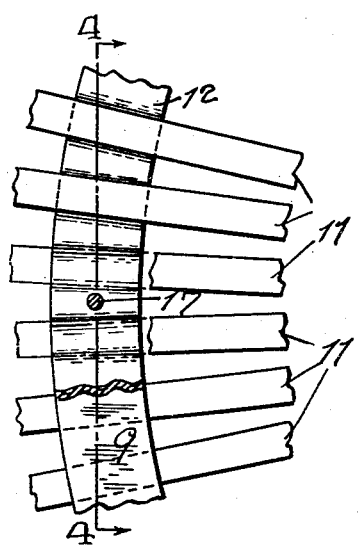
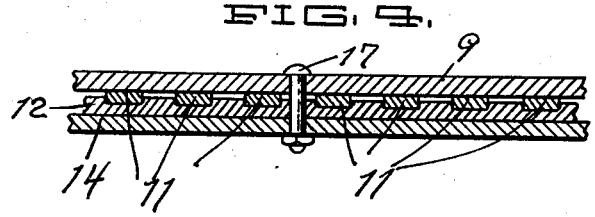
INVENTOR.
GEORGE T. TOKUNAGA
BY
*Victor J. Evans & Co*
ATTORNEYS.

Patented Oct. 4, 1932

1,880,580

UNITED STATES PATENT OFFICE

GEORGE T. TOKUNAGA, OF SAN FRANCISCO, CALIFORNIA

RAKE

Application filed July 8, 1931. Serial No. 549,526.

This invention relates to improvements in rakes and has particular reference to that type of rake commonly known as a bamboo rake.

The principal object of this invention is to provide means whereby the teeth of a bamboo rake may be individually inserted or removed so that the rake may be kept in repair at all times.

A further object is to provide means whereby the teeth of the rake will be securely held against accidental withdrawal.

A further object is to provide a rake wherein the number of teeth employed may be varied so as to accommodate for various conditions.

A still further object is to produce a rake which is strong, and one which will stand a considerable amount of abuse without breaking.

A further object is to produce a rake which is easy to handle thru its lightness in counter-distinction to the customary heavy iron rake.

Other objects and advantages will be apparent during the course of the following description.

In the accompanying drawing forming a part of this specification and in which like numerals are employed to designate like parts throughout the same, Figure 1 is a top plan view of my rake with the handle partly broken away, Figure 2 is a cross-sectional view taken on the line 2—2 of Fig. 1, Figure 3 is an enlarged fragmentary detail view of the teeth securing means, Figure 4 is a cross-sectional view taken on the line 4—4 of Fig. 3, and Figure 5 is a fragmentary perspective view of a portion of the resilient teeth engaging member.

Bamboo rakes have been in common use for a long time and are particularly useful on lawns and flower gardens for the reason that they are not as harsh upon the delicate plants which may be accidently contacted, as are the teeth of an iron rake. These rakes have become very popular for that reason, but they are subject to breakage, due to the light construction of the teeth, and after a few teeth have been broken, the rake is no longer of much value.

Applicant has therefore devised a rake having all the advantages of the ordinary bamboo rake with the added advantage that when the teeth become broken, they may be removed, and new teeth substituted therefor, or if it is desired to provide a rake having a space so as to straddle a row of growing plants, several teeth may be removed, and the rake used in this condition, the same straddling the row and raking on both sides thereof. The teeth when replaced are held in place by suitable resilient pads, which pads press against the teeth and hold the same securely and in a fixed position. Applicant has devised a means for holding the teeth which permits of a very quick change from a broken tooth to a new one.

In the accompanying drawing wherein for the purpose of illustration is shown a preferred embodiment of my invention, the numeral 5 designates the handle of a rake to which is secured a frame having diverging sides 6 and 7. These sides are connected by arcuate cross-pieces 8 and 9. These arcuate cross-pieces serve to support a plurality of resilient teeth 11, which teeth are held thereagainst by resilient teeth engaging members preferably rubber 12 and 13 which are held in place by arcuate clamping strips 14 and 16. Bolts 17 passing thru the arcuate cross-pieces, resilient teeth engaging members and the arcuate clamping strips serve to compress the teeth 11 in such a manner that the teeth are imbedded in the resilient members sufficiently strong to prevent any relative movement of the teeth.

It will thus be seen that I have produced a rake which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a handle, a frame work secured to said handle, said frame work including a pair of diverging members and arcuate cross-pieces extending between said diverging members, a resilient teeth engaging member and clamping member secured to each of said arcuate cross-pieces whereby teeth positioned between said arcuate cross-pieces and said resilient members will be engaged and retained thereby.

2. In a device of the character described, the combination with a rake having a handle and a pair of diverging members secured to said handle, of a pair of spaced cross-pieces extending between said diverging members, said cross-pieces serving to support a plurality of spaced flexible rake teeth, a resilient teeth engaging member positioned on each of said cross-pieces and bearing against said teeth and parallel to said cross-pieces—clamping members engaging said resilient members, and means for compressing said resilient members for the purpose specified.

In testimony whereof I affix my signature.

GEORGE T. TOKUNAGA.